United States Patent [19]

Haslett, Jr.

[11] 4,177,049
[45] Dec. 4, 1979

[54] COMPRESSED GAS FILTER

[75] Inventor: John A. Haslett, Jr., San Marino, Calif.

[73] Assignee: Flo Dri Company, Los Angeles, Calif.

[21] Appl. No.: 854,838

[22] Filed: Nov. 25, 1977

[51] Int. Cl.$^2$ .................... B01D 25/06; B01D 27/02; B01D 29/14; B01D 29/24
[52] U.S. Cl. ........................................ 55/483; 55/485; 55/487; 55/501; 55/503
[58] Field of Search .................. 55/483, 485, 486, 487, 55/501, 503, 509, 515; 292/256.71, 256.73

[56] References Cited

U.S. PATENT DOCUMENTS

| 1,140,414 | 5/1915 | Steel | 292/256.73 |
|---|---|---|---|
| 2,014,895 | 9/1935 | Hewitt | 55/503 |
| 2,225,990 | 12/1940 | Henry | 55/509 |
| 2,593,132 | 4/1952 | Gannon | 55/509 |
| 2,771,153 | 11/1956 | Hennig | 55/484 |
| 3,186,148 | 6/1965 | Merrill et al. | 55/387 |
| 3,307,335 | 3/1967 | Shomaker | 55/484 |
| 3,509,696 | 5/1970 | Thompson | 55/509 |
| 3,527,027 | 9/1970 | Knight et al. | 55/487 |
| 3,678,662 | 7/1972 | Grote | 55/515 |
| 3,888,644 | 6/1975 | Holland et al. | 55/484 |
| 4,032,457 | 6/1977 | Matchett | 55/487 |

Primary Examiner—Frank W. Lutter
Assistant Examiner—Gregory N. Clements

Attorney, Agent, or Firm—William W. Haefliger

[57] ABSTRACT

A filter assembly to remove impurities from a pressurized fluid stream comprises:

(a) a longitudinally elongated barrel, first and second end structures at opposite ends of the barrel, said structures including end caps, and elongated tie members spaced about the barrel and removably interconnecting said end caps, (b) the barrel adapted to receive flexible container means containing fluid stream filtering material, and a spring located within the barrel between one of said end structures and said flexible container means to pressurize the latter for expanding same sidewardly against the barrel, and (c) the first end structure containing a fluid inlet and an annular plenum communicating with said inlet, said first end structure having an annular wall extending about a cavity in endwise longitudinal alignment with the barrel interior, said plenum extending about said wall which contains multiple through openings angled to pass pressurized fluid from the plenum to the cavity in sub-flow streams which are caused to impinge upon one another and turbulently mix together to detrain liquid and solid impurities from the fluid stream prior to flow thereof through the filter material in the barrel.

11 Claims, 5 Drawing Figures

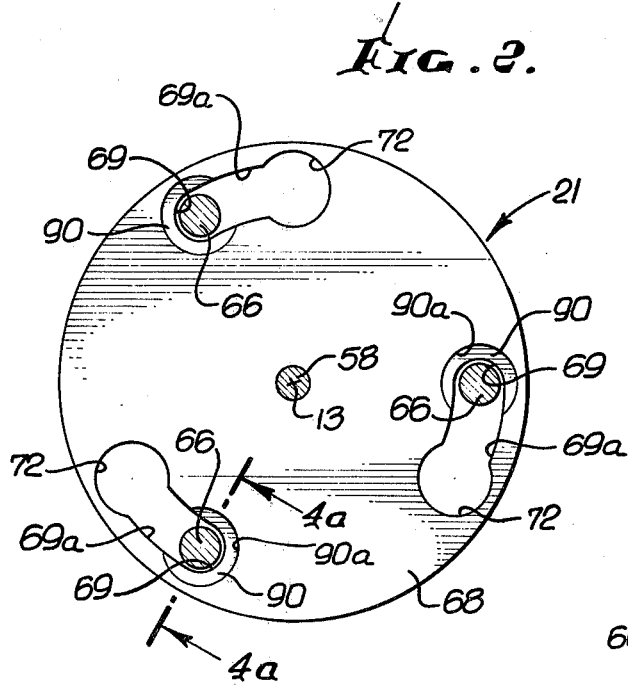
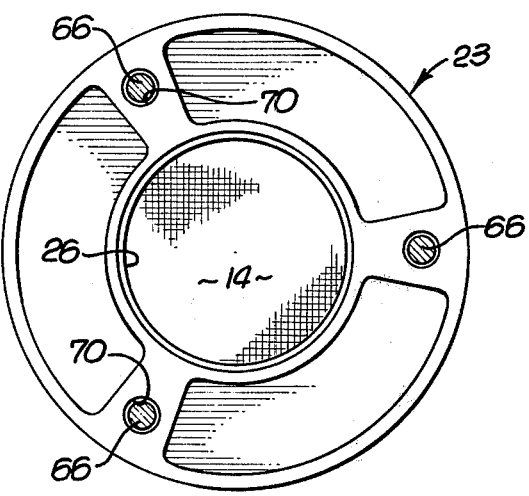
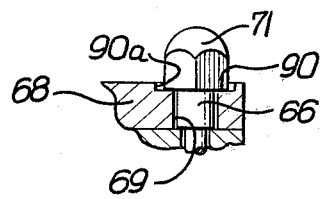
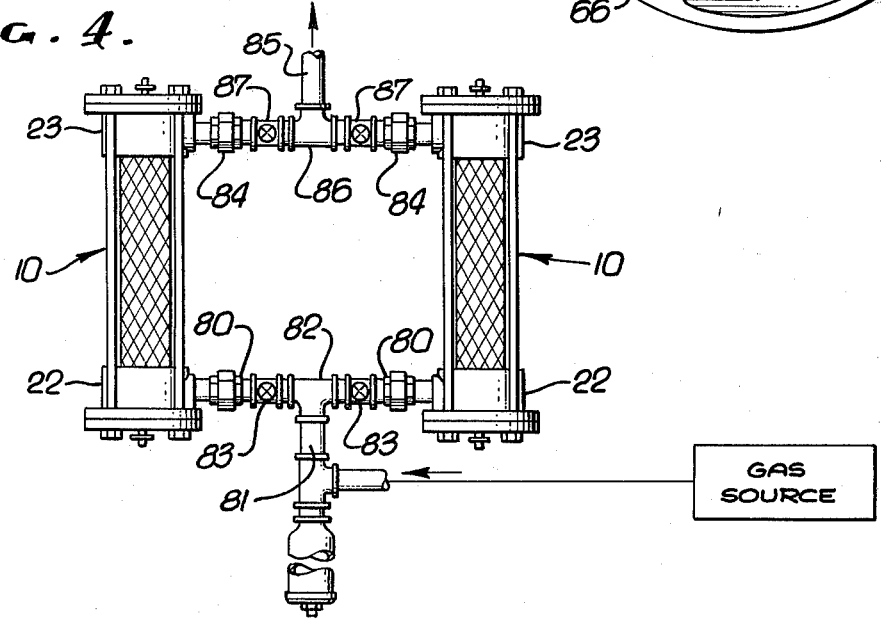

COMPRESSED GAS FILTER

BACKGROUND OF THE INVENTION

This invention relates generally to compressed gas filters, and more particularly concerns a filter assembly for treating compressed air.

It is well known that compressed air contaminated with liquid such as oil and water, and also with particulate matter, presents problems in industrial applications where clean air is required. These can result in reduced efficiency, increased down time for tools and instruments, with consequent production losses and decreased quality of output. U.S. Pat. No. 3,186,148 describes one approach toward overcoming the above problems; however, certain problems remain.

SUMMARY OF THE INVENTION

It is a major object of the invention to provide improved filter assembly structure characterized as overcoming the above as well as other problems associated with removing liquids and other impurities in fluid streams. Basically, the assembly comprises:

(a) a longitudinally elongated barrel, first and second end structures, at opposite ends of the barrel, such structures including end caps, and elongated tie members spaced about the barrel and removably interconnecting said end caps, (b) the barrel adapted to receive flexible container means containing fluid stream filtering material, and a spring located within the barrel between one of said end structures and said flexible container means to pressurize the latter for expanding same sidewardly against the barrel, and (c) the first end structure containing a fluid inlet and an annular plenum communicating with said inlet, said first end structure having an annular wall extending about a cavity in endwise longitudinal alignment with the barrel interior, said plenum extending about said wall which contains multiple through openings angled to pass pressurized fluid from the plenum to the cavity in sub-flow streams which are caused to impinge upon one another and turbulently mix together to detrain liquid and solid impurities from the fluid stream prior to flow thereof through the filter material in the barrel.

In operation, when contaminated fluid such as compressed air enters the filter assembly, most suspended solids in the flow stream are detrained due to loss of velocity in the plenum and cavity. Air continues to flow upwardly through the chemically inert absorbing medium, typically located in several filter cartridges which may be quickly changed without removal of the barrel from the air flow path. Channeling of air is eliminated by the spring loading of the cartridges; and the filter media does not become clogged with media debris arising from particle oscillation in the air, even though pulsation may exist in the air stream. Contamination may be visually detected via the transparent barrel, and a safety cage is typically installed around the latter. Detrained liquids may be easily removed at the lower end of the assembly.

Further, a perforated filter plate is typically located at the lower end of the barrel to enhance contaminant removal as via additional diffuser effect, and a liquid coalescing filter may be provided adjacent that plate; the upper end structure may have the same construction as the lower end structure for economy and efficient operation; another perforated plate may be located at the top end of the barrel to block upward displacement of the uppermost cartridge, and screen and/or a micron filter may be located adjacent that plate; provision is made for ease of replacement of the cartridges via the end of the barrel, as by simple rotary displacement and removal of one or both end caps off body members, the special interfit of the end caps with tie members facilitating such functions; and the assemblies may be interconnected in parallel pairs in a flow circuit; with advantages as will be seen.

These and other objects and advantages of the invention, as well as the details of an illustrative embodiment, will be more fully understood from the following description and drawings, in which:

DRAWING DESCRIPTION

FIG. 2 is a plan view on lines 2—2 of FIG. 1;

FIG. 3 is a plan view on lines 3—3 of FIG. 1;

FIG. 4 is an elevation showing an installation embodying the invention;

FIG. 4a is a section on lines 4a—4a of FIG. 2; and

DETAILED DESCRIPTION

Figure 1:
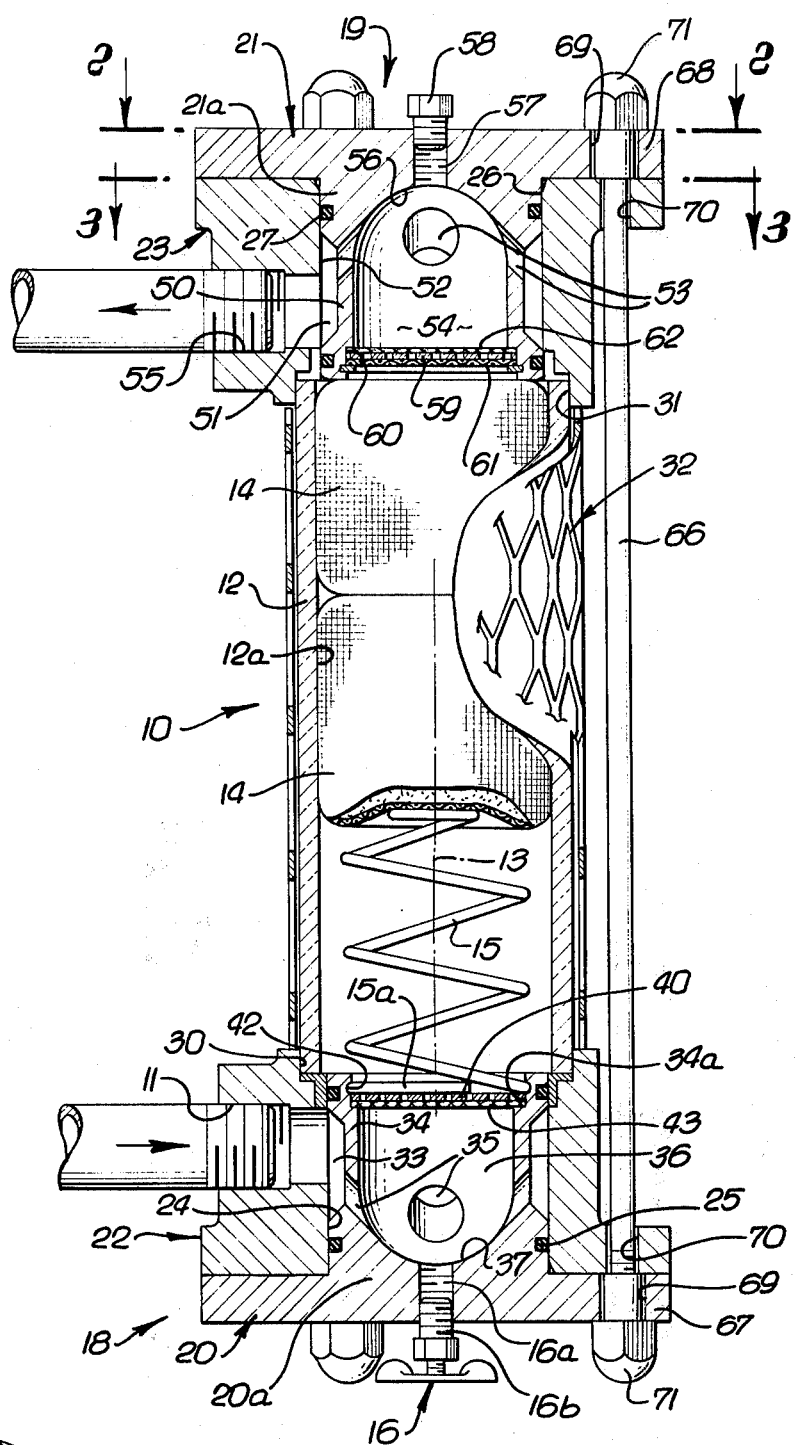
FIG. 1 is a vertical section through a filter assembly embodying the invention.

In the drawings, the filter assembly 10 is constructed to remove impurities from a pressurized fluid stream, which may for example consist of gas or air entering the assembly at inlet port 11. The assembly includes a longitudinally elongated tubular barrel 12 having an axis 13, and which may consist of glass or transparent plastic material, for example. The barrel may alternatively consist of metal such as aluminum, or stainless steel. Accordingly, the status of the filter means within the barrel may be visibly ascertained. Such means typically includes flexible container means containing gas stream filtering media such as a desiccant, as for example silica gel, or activated charcoal or other similar material in granular form. Some material is typically of neutral pH, it absorbs moisture, and is non-deliquescent. The flexible container means may include one or more cartridges as are illustrated at 14.

A coil spring 15 is located in the lower part of the barrel and is axially compressed to urge the cartridges upwardly in the barrel, and acting to expand them against the barrel bore 12a. Accordingly, any trapped water, oil, oil vapor, and/or oil water emulsion drains downwardly from the cartridges to the lowermost extent of the barrel, for ultimate withdrawal, as via a drain 16 to be described. Such drainage and withdrawal can occur when fluid pressure is not transmitted via plenum 23 and openings 35. Also, the action of the spring in expanding the cartridges against bore 12a serves to prevent channeling or by-passing of the gas stream past the filter means. Such channeling could otherwise be produced as by a pulsating gas stream, for example.

The assembly 10 also includes first and second end structures at opposite ends of the barrel, such structures for example being illustrated at 18 and 19. They include end caps designated at 20 and 21, and may include first and second annular bodies 22 and 23 receiving and supporting the end caps, as shown. Body 22 has a bore 24 receiving central portion 20a of cap 20, an annular seal being provided at 25. Similarly, second body 23 has a bore 26 receiving central portion 21a of cap 21, and annular seal is provided at 27 between these elements. The bodies are counterbored at 30 and 31 to telescopically interfit the opposite ends of the barrel 12. A perforated metallic safety cage 32 in cylindrical form may be provided about the barrel, and retained between bodies 22 and 23, to protect against inadvertent shattering of barrel 12.

In accordance with an important aspect of the invention, the first end structure 18 contains an annular plenum, as for example at 33, communicating with inlet 11 in body 22. The plenum is typically formed between bore 24 and an annular wall 34 integral with end cap 20. Wall 34 contains multiple openings 35 angled to pass pressurized gas from the plenum into a central cavity 36 formed in the end cap in longitudinally and axial alignment with the barrel. Typically, the end cap 20 forms a concave interior end wall 37 facing the spring, and the openings 35 are angled radially and longitudinally downwardly toward the wall. Three such openings may be provided at 120° intervals about axis 13, the gas streams flowing through such openings being caused to impinge upon one-another in the cavity and adjacent wall 37, with turbulence, to detrain liquid and solid impurities from such streams prior to their subsequent flow upwardly through the barrel. Essentially, the lower end structure acts as a diffuser for entering air. As a result, impurities such as detrained liquid and particles in such liquid may be removed by gravity flow through drain outlet 16a in the cap 20. A drain plug 16b may be removed, periodically, for this purpose.

Figure 5:
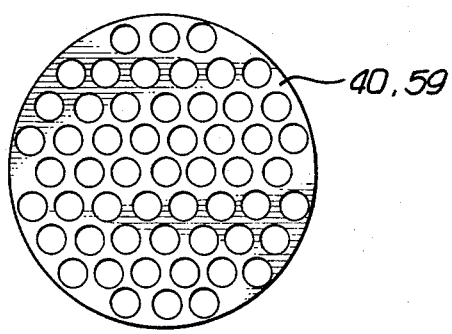
FIG. 5 is a plan view of a perforated disc as embodied in FIG. 1.

A perforated filter plate 40, as for example is seen in FIG. 5, is removably installed to extend transversely across the upward flow path of gas from cavity 36 into the barrel, the plate located proximate the lower end of the spring. Note that the upper end portion of wall 34 may be counterbored at 34a to peripherally receive the plate or disc 40. The lowermost turn 15a of spring 15 may be employed to removably hold the plate in position, that turn being received in a groove 42 in the wall upper end portion. In addition, a liquid coalescing filter 43 may be provided adjacent the plate, as for example at its underside. The filter 43 may be bonded to the underside of the perforated plate 40, and may contain small perforations to pass the air flow; for example, it may consist of glass fibers, from which water droplets may drain into the cavity.

The second end cap 21 and body 23 may correspond to, or be like, cap 20 and body 22, whereby they may be interchangeable, for simplicity of construction and assembly. Accordingly, the cap 21 defines an annular wall 50 projecting within a hollow interior formed by body 23, there being an annular plenum 51 formed between wall 50 and body bore 52. Multiple openings (as for example three) 53 through wall 51 pass gas from cavity 54 to the plenum from which gas flows to outlet 55 in body 23. Openings 33 are angled radially and longitudinally away from the concave end wall 56. Axial port 57 communicating with wall 56 is plugged at 58.

Perforated disc or plate 59, corresponding to plate 40, is received in counterbore 60 in the lower extent of wall 50; and a wire mesh screen 61 may be located adjacent the plate at its underside. These elements trap any solid impurities or particles that may escape from the filter cartridges 14. In addition, a micron filter 62 may be located adjacent the upper side of the disc 59 to trap very small particles, i.e. of micron size.

Also shown in FIG. 1 are tie members 66 extending longitudinally outwardly of the barrel, and interconnecting flanges 67 and 68 integral with the end caps. The tie rods are spaced at equal intervals about the axis 13, and project through openings 69 in the flanges and also through openings 70 in the bodies 22 and 23. As seen in FIG. 2, the openings 69 are circularly elongated at 69a, whereby the flanges and associated end caps may be rotated about axis 13, into positions wherein enlarged heads 71 on the tie members are in registration with enlarged openings 72 in the flanges. Openings 72 are sized to axially pass the heads, permitting removal of the rotated end caps, for replacement of the filter cartridges, all without disturbing the assembly of the bodies 22 and 23 to the barrel. The end caps may then be replaced and rotated back into positions wherein the tie members extend in openings 69. The heads 71 at the lower ends of the tie members may be thread connected to the tie members to be tightened against the lower end cap, or loosened to permit removal of that cap.

FIG. 4 shows two filter assemblies 10 as described, extending in upright, parallel relation. First branch pipes 80 interconnect the gas inlets; and supply piping 81 is connected with pipes 80 via a tee 82. Valves 83 in branches 80 control flow to the assemblies 10. Likewise, second branch pipes 84 interconnect the gas outlets from the assemblies 10; and delivery piping 85 is connected to branches 84 via tee 86. Valves 87 in branches 84 control flow therethrough. Such an installation is of particular advantage in that either assembly 10 may be employed, or taken out of the flow stream by manipulation of valves 83 and 87 for replacement of its filter cartridges, while the other assembly remains in use. Note that the connections of the bodies 22 and 23 to the branch pipes remain undisturbed while the cartridges replacement is effected.

FIGS. 2 and 4a show that the flange 68 defines shallow recesses 90 at the ends of the elongated openings 69a remote from the enlarged openings 72. Such recesses act to retain the heads (i.e. castellated nuts) preventing inadvertent relative rotation of the flange and tie rods. It is only after the flange 68 is urged toward the opposite flange 67 that the heads clear the shallow shoulders at 90a to permit excape of the heads from the recesses, allowing such relative rotation.

I claim:

1. In a filter assembly to remove impurities from a pressurized fluid stream, the combination comprising:

(a) a longitudinally elongated barrel, first and second end structures at opposite ends of the barrel, said structures including end caps, and elongated tie members spaced about the barrel and removably interconnecting said end caps, (b) there being flexible container means in the barrel containing fluid stream filtering material, and a spring located within the barrel between one of said end structures and said flexible container means to pressurize the latter for expanding same sidewardly against the barrel, and (c) the first end structure containing a fluid inlet and an annular plenum communicating with said inlet, said first end structure having an annular wall extending about a cavity in endwise longitudinal alignment with the barrel interior, said plenum extending about said wall which contains multiple through openings angled to pass pressurized fluid from the plenum to the cavity in streams which are caused to impinge upon one another and turbulently mix together to detrain liquid and solid impurities from the fluid streams prior to flow thereof through the filter material in the barrel, (d) said first end structure end cap forming a concave interior wall facing toward said spring, said cavity being interiorly open to facilitate said turbulent mixing interiorly of the cavity, said openings in said annular wall angled transversely and longitudinally toward said concave interior wall and in direction away from the spring, the spring spaced from the cavity, there being a perforated filter plate extending across the end of the open cavity opposite said concave interior wall, the spring located at the side of said plate opposite the cavity, and (e) the second end structure defining a fluid outlet communicating with the barrel to receive fluid that has passed through said filtering material, (f) said spring comprising a coil spring having a lowermost turn adjacent said filter plate, the spring located between said cap and said filter material container means, there also being liquid coalescing filter means extending parallel to and proximate said filter plate at a level above the level of the openings, (g) said first openings in said annular wall being angled to extend transversely inwardly and downwardly generally tangentially relative to and toward said concave interior wall, said wall being upwardly concave so that liquid impurities drain toward the lowermost extent of said wall, there being a drain opening through said cap proximate the lowermost extent of said wall, and a drain valve controlling said drain opening, (h) and including a safety cage surrounding said barrel to protect against inadvertent bursting thereof.

2. The filter assembly of claim 1 including said flexible container means within the barrel and compressed longitudinally by said spring.

3. The filter assembly of claim 1 wherein said barrel is metallic.

4. The combination comprising:
(i) two filter assemblies as defined in claim 1, said assemblies extending in upright parallel relation, said second end structures being hollow and defining fluid stream outlets,
(ii) first branch piping interconnecting said fluid inlets defined by the first end structures, supply piping connected with said first branch piping at a first tee, and valves in said first branch piping between said first tee and said fluid inlets, and
(iii) second branch piping interconnecting said fluid outlets defined by the second end structures, delivery piping connecting with said second branch piping at a second tee, and valves in said second branch piping between said tee and said fluid outlets.

5. The filter assembly of claim 1 wherein said barrel is non-metallic and translucent.

6. The assembly of claim 1 wherein said first end structure includes a first annular body interfitting a first end of the barrel, said cap defining said annular wall within the first body and having a flange to which said tie members have rotary releasable interconnection in response to rotation of the first end cap relative to the first body and about a longitudinal axis defined by the first end cap.

7. The assembly of claim 6 wherein said second end structure also including a second annular body interfitting a second and opposite end of the barrel, and a second end cap having a flange to which said tie members have rotary releasable interconnection in response to rotation of the second end cap relative to the second body and about a longitudinal axis defined by the second end cap.

8. The combination of claim 7 wherein said rotary releasable interconnection includes circularly extending openings in the flange and through which said tie members extend, heads on the ends of the tie members and having larger cross dimension than said openings whereby the heads transmit loading to the flange, portions of the openings being enlarged to pass the heads in one rotated position of the flange relative to the tie members, the flange defining recesses to receive and retain said heads in another rotated position of the flange relative to the tie members.

9. The filter assembly of claim 7 wherein said second end structure is at a higher level than said first end structure, said second end cap defining an annular wall projecting within a hollow interior defined by the second annular body, said second annular body defining a fluid outlet and there being an annular plenum between the annular wall and said second annular body, there being a cavity defined by the second end cap and about which said second end cap annular wall extends, said cavity being in longitudinal alignment with the barrel, and there being multiple through openings through said annular wall.

10. The filter assembly of claim 9 including a micron filter between said cavity defined by said second end cap and said barrel.

11. The filter assembly of claim 9 including a perforated plate extending transversely between said cavity and said barrel and carried by said second end caps annular wall, and a second adjacent said plate.

* * * * *